United States Patent
Liechti

[15] 3,682,946
[45] Aug. 8, 1972

[54] NEW BIS-NAPHTHOXAZOLYL-DERIVATIVES

[72] Inventor: Peter Liechti, Binningen, Germany

[73] Assignee: Ciba-Geigy

[22] Filed: March 2, 1970

[21] Appl. No.: 15,912

[30] Foreign Application Priority Data

March 6, 1969 Switzerland ............... 3406/69

[52] U.S. Cl. .................. 260/307 D, 252/301.2 W
[51] Int. Cl. ............................................. C07d 85/48
[58] Field of Search .............................. 260/307 D

[56] References Cited

FOREIGN PATENTS OR APPLICATIONS 11,247   5/1968   Japan

*Primary Examiner*—Alex Mazel
*Assistant Examiner*—R. V. Rush
*Attorney*—Harry Goldsmith, Joseph G. Kolodny and Mario A. Monaco

[57] ABSTRACT

The present invention relates to new azole derivatives of the naphthoxazole type which in the most general case correspond to the formula (1)

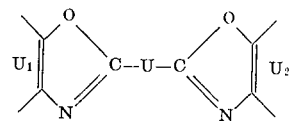

wherein U denotes a diphenyl radical bonded in the 4,4'-position to the oxazole rings and $U_1$ and $U_2$ denote naphthalene radicals fused to the oxazole rings, and wherein up to four positions capable of substitution in U; $U_1$ and $U_2$ can be substituted with optionally substituted alkyl groups, halogen or optionally functionally modified sulphonic acid groups and up to 2 positions capable of substitution can be substituted with optionally substituted phenyl groups, phenylalkyl groups, —$SO_2$-phenyl, nitrile or optionally functionally modified carboxyl groups. The naphthoxazole compounds are useful as optical brightening agents.

4 Claims, No Drawings

NEW BIS-NAPHTHOXAZOLYL-DERIVATIVES

SPECIFIC EMBODIMENTS

Within the framework of Formula (1), those compounds are above all of interest which correspond to the general formula (2)
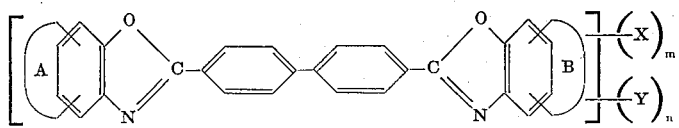

wherein A and B can be identical or different and each denotes a benzene ring fused onto the benzoxazole ring system, X denotes hydrogen or an alkyl group which contains one to 18 C atoms and is optionally further substituted, halogen or a group —SO₂Z, Y represents hydrogen or a phenyl group, phenylalkyl(one to four C) group, an —SO₂-phenyl group or a —COZ group, wherein Z denotes the group —OH, —OMe (Me = cation of a water-soluble salt), —OR, —NHR or —N(R)₂, and R represents an alkyl group containing up to 12 C atoms or a phenylalkyl (one to four C) or phenyl group, m denotes an integer from 1 to 4, n denotes an integer from 1 to 2 and the sum m + n is not greater than 4.

The opened rings with the symbols A and B, contained in this formula as well as the subsequent formulae, denote that the isomeric naphthoxazole radicals are to be understood thereby, that is to say the radicals

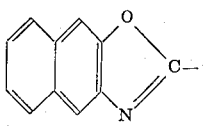 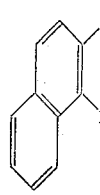 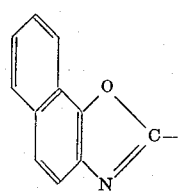

(1a)        (1b)        (1c)

As expressed by the bracket, the substituents X and Y can be present both in the naphthoxazole radicals and also in the central diphenylyl grouping.

In explaining the substitution possibilities it should be noted that under alkyl groups which are optionally further substituted there should in principle be grouped together all inherently customary substitution possibilities in alkyl groups, that is to say for example hydroxyalkyl, alkoxyalkyl, carboxyalkyl, carbalkoxyalkyl, halogenalkyl, amino (or alkylamino- and acylaminoalkyl) or quaternization products of alkylaminoalkyl, sulphonic acid- (or ester) -alkyl, cyanalkyl and others. Alkyl groups can of course be either straight-chain or branched in nature.

In the case of halogen, chlorine and fluorine are predominantly possible. Phenylalkyl groups in general do not have more than 4 C atoms in the alkyl part.

Compounds of preferred significance within the framework of Formula (1) are those which correspond to the formula (3)
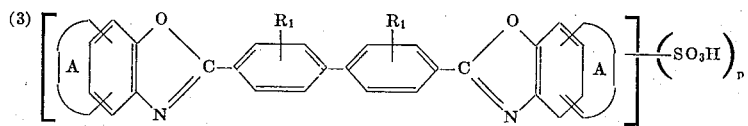

wherein A denotes a benzene ring fused onto the benzoxazole ring system, R₁ represents hydrogen or an alkyl group containing one to four carbon atoms and p represents the numbers 0, 1 or 2, with the sulphonic acid groups which are possible as substituents (including their salts) being located on benzene rings of the general formula.

As regards the technical aspects of their use, those compounds according to general Formula (1) are of interest which correspond to the formula (4)
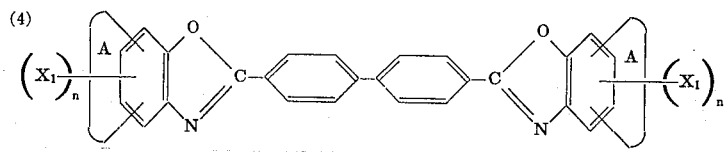

wherein A denotes a benzene ring fused onto the benzoxazole ring system, X₁ denotes hydrogen, an alkyl group containing one to four carbon atoms, chlorine or the group —SO₂Z, wherein Z represents the group —OH, —OMe (Me = cation of a water-soluble salt), —OR, —NHR or —N(R)₂, and R represents an alkyl group containing up to 12 carbon atoms, or a phenylalkyl (one to four C) or phenyl group, and n denotes the numbers 1 or 2.

Compounds of preferred significance are the subgroup of naphthoxazole compounds of Formula (1), to which the unsubstituted base substance and the lower sulphonic acid derivatives belong. These compounds can accordingly be described by the following Formulae (5) and (6):

Compounds of formula (5)
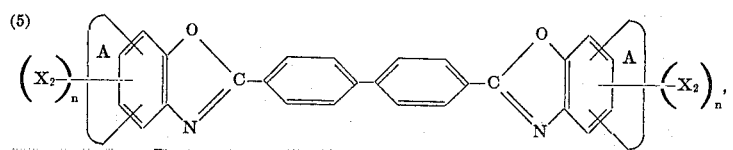

wherein A denotes a benzene ring fused (in positions 4:5, 5:6 or 6:7) to the benzoxazole ring system, X₂ represents hydrogen or a sulphonic acid group as well as its water-soluble salts and n denotes the numbers 1 or 2.

Compounds of formula (6) 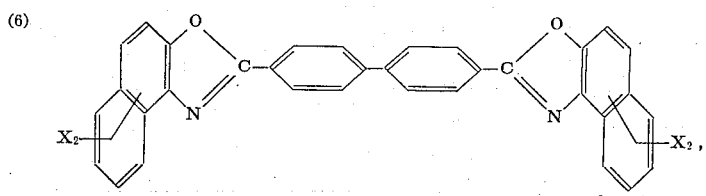

wherein $X_2$ represents hydrogen or a sulphonic acid group or its water-soluble salts.

Amongst water-soluble salts of carboxylic acids and sulphonic acids of the compound types mentioned, the alkali, ammonium and amine salts should especially be highlighted.

The new bis-azoles of Formula (1) can be manufactured according to various methods which are in themselves known. A possible procedure is for example to react diphenyl-dicarboxylic acid derivatives of formula (7) 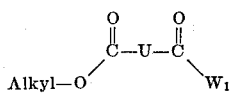

wherein $W_1$ represents a hydroxyl group, an alkoxy group or a halogen atom, especially a chlorine atom and the diphenyl nucleus U can be substituted in the sense of Formula (1), with an o-amino compound of formula (8) 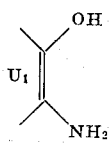

in accordance with the following scheme:

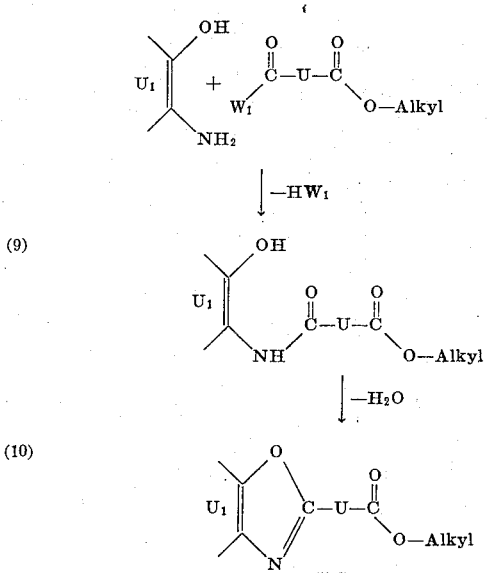

Thereafter, the alkyl ester group of the azole compound of Formula (10) is optionally saponified to give the carboxyl group, optionally converted into a carboxylic acid halide group, especially carboxylic acid chloride group, and the compound of formula

(11) 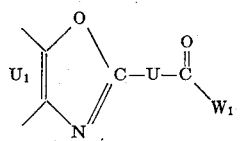

now obtained, wherein $W_1$ has the significance given in conjunction with Formula (7), is reacted with an o-amino compound of formula

(12) 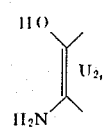

wherein U, $U_1$, and $U_2$ have the initially indicated significance, in accordance with the following reaction scheme:

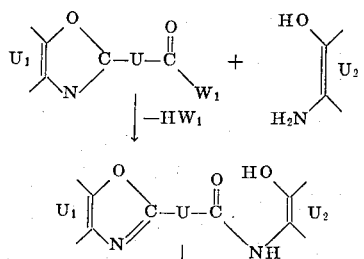

(13) 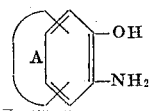

↓

Bis-azole compound of Formula (1).

Bis-azoles of Formula (3) are appropriately manufactured by condensing about 2 mols of an aminophenol of formula

(14) 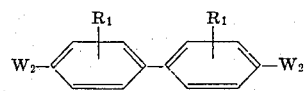

with about 1 mol of a compound of formula

(15) 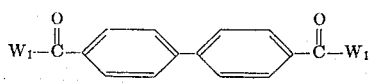

and bringing about oxazole cyclization, by heating to temperatures above 100°C in the presence of agents which split off water, with A and $R_1$ in the above formulae having the abovementioned significance and $W_2$ representing a carboxyl group, carboxylic acid ester group, carboxylic acid halide group or nitrile group, and with a post-sulphonation with inherently customary sulphonation agents for benzene aromatic compounds being carried out in the case where p in Formula (3) is other than zero.

Bis-oxazoles of Formula (4) can for example be obtained if compounds of formula (16)

wherein $W_1$ represents a hydroxyl group, an alkoxy group or a halogen atom, especially a chlorine atom, are reacted in a molecular ratio of 1:2 with o-amino compounds of formula

(17) 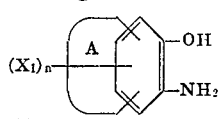

in accordance with the following reaction scheme:

(18) 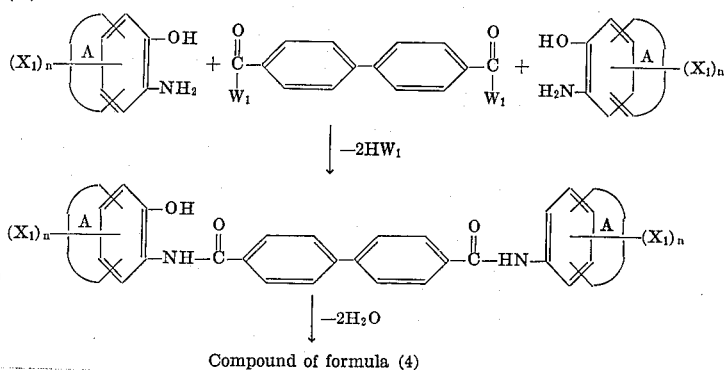

Compound of formula (4)

The reaction between the particular components of Formulae (7) and (8), (11) and (12), (14) and (15), as well as (16) and (17) can be carried out with or without intermediate separation of the acylamino compounds of Formulae (9), (13), (18) or the like first produced, by heating to higher temperatures, for example to 120°–350°C, advantageously in an inert gas, for example in a stream of nitrogen, with the reaction optionally being carried out in the presence of a catalyst. Suitable catalysts are for example boric acid, boric acid anhydride, zinc chloride, p-toluenesulphonic acid and also polyphosphoric acid, including pyrophosphoric acid. If boric acid is used as the catalyst, then this is advantageously used in an amount of 0.5 to 5 percent relative to the total weight of the reaction mass. It is also possible conjointly to use high-boiling polar organic solvents, such as for example dimethylformamide, dichlorobenzene, trichlorobenzene and aliphatic optionally etherified hydroxyl compounds, for example propylene glycol, ethylene glycol monoethyl ether or diethylene glycol diethyl ether, as well as high-boiling esters of phthalic acid, such as for example dibutyl phthalate.

Preferably, however, the process is carried out in two steps, by first condensing the carboxylic acid halides, especially carboxylic acid chlorides of Formulae (7), (11), (15), or (16) with the o-amino compounds of formulae (8), (12), (14), or (17) in the presence of an organic inert solvent such as toluene, xylenes, chlorobenzene, dichlorobenzene, trichlorobenzene or nitrobenzene at temperatures between 100° and 200°C and subjecting the resulting acyl compounds of Formulae (9), (13), and (18) at temperatures above 100°C, preferably between 120° and 350°C, and in the presence of a catalyst which splits off water, to the cyclization reaction to form the azole derivatives. If carboxylic acid chlorides are used as starting substances, then these can be manufactured directly before the condensation with the o-amino compound and without isolation from the free carboxylic acid and thionyl chloride, optionally with the addition of a catalyst such as pyridine, in the solvent wherein the subsequent condensation takes place.

The compounds of Formula (1) obtained according to the process described can, if desired, be reacted yet further to give compounds which also fall within the framework of Formula (1). Thus water-soluble derivatives are obtained if compounds of Formula (1) are sulphonated with sulphonating agents which are in themselves customary, (for example concentrated sulphuric acid, oleum and the like). The sulphonic acid derivatives thus obtained (for example, disulphonic acid according to Formula 25) can be used as brighteners for cotton.

Furthermore, alkyl and acyl groups can be produced by Friedel-Crafts reactions, or subsequent chloralkylations or chlorinations can be carried out.

A further route to water-soluble derivatives of Formula (1) consists of further reacting sulphochlorides or carboxylic acid chlorides of Formula (1) with such alcohols or amines as contain groups which confer solubility in water or groups which can be converted into such groups—for example by quaternization—such as sulphonic acid groups and amino groups.

Furthermore, water-soluble derivatives of Formula (1) can also be obtained by converting halogenalkyl groups into the corresponding quaternary derivatives by means of tertiary bases.

The new compounds defined above possess a more or less pronounced fluorescence in the dissolved or finely divided state. They can be used for the optical brightening of the most diverse synthetic, semi-synthetic or natural organic materials or substances which contain such organic materials.

As examples thereof, the following groups of organic materials may be mentioned, to the extent that optical brightening of these is possible, without the survey which follows being intended to express any restriction thereupon:

I. Synthetic organic high molecular materials:

a. Polymerization products based on organic compounds containing at least one polymerizable carbon-carbon double bond, that is to say their homopolymers or copolymers as well as their post-treatment products such as for example crosslinking, grafting or degradation products, polymer dilutions, products obtained by modification of reactive groups, and the like, such as for example polymers based on $\alpha,\beta$-unsaturated carboxylic acids or derivatives of such carboxylic acids, especially on acrylic compounds (such as for example acrylic esters, acrylic acid, acrylonitrile, acrylamides and their derivatives or their methacrylic analogues), on olefine hydrocarbons (such as for example ethylene, propylene, styrenes or dienes, and also so-called ABS polymers), and polymers based on vinyl and vinylidene compounds (such as for example vinyl chloride, vinyl alcohol and vinylidene chloride).

b. Polymerization products such as are for example obtainable by ring opening, for example, polyamides of the polycaprolactam type, also polymers which are obtainable both via polyaddition and polycondensation, such as polyethers or polyacetals.

c. Polycondensation products or precondensates based on bifunctional or polyfunctional compounds possessing condensable groups, their homo-condensation and co-condensation products as well as products of post-treatment, such as for example polyesters, saturated (for example polyethylene glycol terephthalate) or unsaturated (for example maleic acid-dialcohol polycondensates as well as their crosslinking products with copolymerizable vinyl monomers), unbranched as well as branched (also based on polyhydric alcohols, such as for example alkyd resins), polyamides (for example, hexamethylenediamine adipate), maleate resins, melamine resins, polycarbonates, and silicones.

d. Polyaddition products such as polyurethanes (cross-linked and uncrosslinked) and epoxide resins.

II. Semi-synthetic organic materials such as for example cellulose esters of various degrees of esterification or mixed esters (acetate or triacetate), cellulose ethers, regenerated cellulose (viscose, or cuprammonium-cellulose) or their post-treatment products, and casein plastics.

III. Natural organic materials of animal or vegetable origin, for example based on cellulose or proteins, such as cotton, wool, linen, silk, natural lacquer resins, starch and casein.

The organic materials to be optically brightened can be in the most diverse processing states (raw materials, semi-finished goods or finished goods). They can also be in the form of structures of the most diverse shapes, that is to say for example predominantly three-dimensional articles such as sheets, profiles, injection mouldings or the most diverse articles for working, chips or granules, or foams, as predominantly two-dimensional articles such as films, foils, lacquers, coverings, impregnations and coatings, or as predominantly one-dimensional articles such as filaments, fibers, flocks or wires. The said materials can on the other hand also be in unshaped states, in the most diverse homogeneous or inhomogeneous forms of division, for example in the form of powders, solutions, emulsions, dispersions, latices, pastes, or waxes.

Fiber materials can for example be in the form of continuous filaments, staple fibers, flocks, hanks, textile filaments, yarns, threads, fiber fleeces, felts, waddings, flocked structures or woven textile fabrics or textile laminates, knitted fabrics as well as papers, cardboards or paper compositions and the like.

The compounds to be used according to the invention are also of importance for the treatment of organic textile materials, especially woven textile fabrics. Where fibers, which can be in the form of staple fibers or endless filaments, hanks, woven fabrics, knitted fabrics, fleeces, flocked substrates or laminates, are to be optically brightened according to the invention, this is advantageously done in an aqueous medium, wherein the compounds in question are present in a finely divided form (suspensions, or optionally solutions). In the treatment, dispersing agents can optionally be added, such as for example soaps, polyglycol ethers of fatty alcohols, fatty amines or alkylphenols, cellulose sulphite waste lye or condensation products of optionally alkylated naphthalene-sulphonic acids with formaldehyde. It has proved particularly appropriate to carry out the process in a neutral, weakly alkaline or acid bath. It is also advantageous if the treatment is carried out at elevated temperatures of about 50° to 100°C, for example at the boiling point of the bath or near to this (about 90°C). For the finishing process according to the invention it is also possible to use solutions in organic solvents, as is practised in so-called solvent dyeing (padder-thermofixing application, exhaustion dyeing process in drum dyeing machines), for example, for polyamide and polyester substrates.

The new optical brighteners according to the present invention can furthermore be added to, or incorporated in, the materials before or during their shaping. Thus they can, for example, be added to the compression molding composition when manufacturing films, sheets (for example milling into hot polyvinyl chloride) or moldings. In the case of spinning compositions (fully synthetic or semi-synthetic materials) the optical brighteners can be added to the starting substances (for example, monomers), the intermediate products (for example, dusting onto polymer chips or granules) or the spinning melts or spinning solutions.

The amounts of the new optical brighteners to be used according to the invention, relative to the material to be optically brightened, can vary within wide limits. A distinct and lasting effect can already be achieved with very small amounts, in certain cases for example amounts of 0.001 percent by weight. It is however also possible to employ amounts of up to about 0.5 percent by weight and above. For most practical purposes, amounts between 0.01 and 0.2 percent by weight are preferably of interest.

The optical brighteners according to the present invention can for example also be employed in the following use forms:

a. Mixed with dyestuffs (shading) or pigments (for example, white pigments), or as an additive to dyebaths or printing, etching or reserve pastes. Also for the aftertreatment of dyeings, prints or discharge prints.

b. Mixed with so-called "carriers," wetting agents, plasticizers, swelling agents, antioxidants, light protection agents, heat stabilizers and chemical bleaching agents (bleaching bath additives).

c. Mixed with crosslinking agents and finishing agents (for example starch or synthetic finishes), and in combination with the most diverse textile finishing processes, especially synthetic resin finishes (for example, "wash and wear," "permanent press," "no iron," flameproof finishes, soft handle finishes, creaseproof finishes or antistatic finishes).

d. In combination with detergents. The detergents and brighteners can be separately added to the wash liquors which are to be used. It is also advantageous to use detergents which contain the brighteners as an admixture. Suitable detergents are for example soaps, salts of sulphonate detergents, such as for example of sulphonated benzimidazoles which are substituted by higher alkyl radicals at the 2-carbon atom, and also salts of monocarboxylic acid esters of 4-sulphophthalic acid with higher fatty alcohols, as well as salts of fatty alcohol sulphonates, alkylarylsulphonic acids or condensation products of higher fatty acids with aliphatic hydroxysulphonic or aminosulphonic acids. Non-ionic detergents can furthermore be employed, for example, polyglycol ethers derived from ethylene oxide and higher fatty alcohols, alkylphenols or fatty amines.

e. Incorporation of the optical brighteners into polymeric carriers (polymerization, polycondensation or polyaddition products) in the dissolved or dispersed form, or use, for example, with coating agents, impregnating agents or binders (solutions, dispersions or emulsions) for textiles, fleeces, paper or leather.

f. As additives to so-called "master batches."

g. As additives to the most diverse industrial products in order to make these more marketable (for example, improving the appearance of soaps, detergents and the like).

h. In combination with other optically brightening substances.

i. In spinning bath preparations, that is to say as additives to spinning baths such as are used for improving the slip for the further processing of synthetic fibers.

k. As scintillators for various purposes of a photographic nature such as for example for electrophotographic reproduction or supersensitization.

If the brightening process is combined with textile treatment or finishing methods, the combined treatment is in many cases advantageously carried out with the aid of appropriate stable preparations which contain the optically brightening compounds in such concentrations that the desired brightening effect is achieved.

When treating a series of fiber substrates, for example of polyester fibers, with the brighteners according to the invention, the appropriate procedure is that these fibers are impregnated with the aqueous dispersions of the brighteners at temperatures below 75°C, for example, at room temperature, and subjected to a dry heat treatment at temperatures above 100°C, it being generally advisable still to dry the fiber material beforehand at a moderately elevated temperature, for example at minimally 60° to about 100°C. The heat treatment in the dry state is then advantageously carried out at temperatures between 120° and 225°C, for example, by warming in a drying chamber, by ironing in the specified temperature range or by treatment with dry superheated steam. The drying and dry heat treatment can also be carried out in immediate succession to one another or be combined into a single working stage.

In the examples, parts, unless otherwise stated, are always parts by weight and percentages always percentages by weight. Unless otherwise stated, melting points and boiling points are uncorrected.

EXAMPLE 1

A mixture of 12.1 g of diphenyl-4,4'-dicarboxylic acid, 15.9 g of 1-amino-2-naphthol, 0.25 g of boric acid, 7.9 g of pyridine and 100 g of a mixture of 73 percent of diphenyl-ether and 27 percent of diphenyl is heated to a temperature of 250°C over the course of about 7 hours in a stream of nitrogen whilst stirring, in the course of which pyridine, the water formed and a little diphenyl/diphenyl-ether mixture distil off. After cooling, filtering off, washing with alcohol and drying, 15.8 g of the crude compound of formula

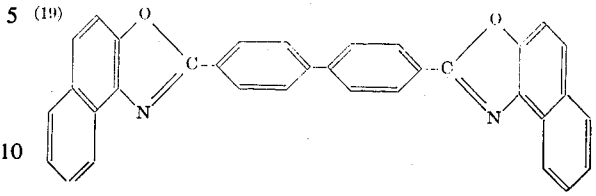
(19)

are obtained as a brown-yellow powder. Repeated recrystallization from dichlorobenzene, using Fuller's earth, yields light yellow crystals of melting point 349° to 351°C.

$C_{34}H_{20}O_2N_2$ . 1/5 dichlorobenzene
Calculated: C 81.4 H 4.1 N 5.4 Cl 2.7
Found: C 81.4 H 4.4 N 5.8 Cl 2.9

EXAMPLE 2

4.64 g of 4,4'-dicyano-3,3'-dimethyl-diphenyl and 6.35 g of 1-amino-2-naphthol in 50 g of polyphosphoric acid are heated to 180°C over the course of 3 hours in a stream of nitrogen, whilst stirring, and kept for 1 hour at 180° to 185°C. After cooling, 70 ml of water are added and the compound of formula

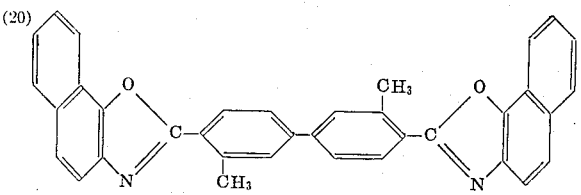
(20)

is filtered off, washed with water and dried. 11.0 g of a brown powder are obtained, which can be purified by chromatography on aluminum oxide (activity I according to Brockmann) with tetrachlorethylene as the eluting agent, and recrystallization from o-dichlorobenzene, to give light yellow crystals of melting point 288° to 290°C.

$C_{36}H_{24}O_2N_2$
Calculated: C 83.70 H 4.68 N 5.42
Found: C 83.75 H 4.74 N 5.44

EXAMPLE 3

2.98 g of diphenyl-4,4'-dicarboxylic acid diethyl ester, 3.18 g of freshly manufactured 2-amino-1-naphthol and 50 g of polyphosphoric acid are warmed to 170°C over the course of 15 minutes in a nitrogen atmosphere whilst stirring, and stirred for 50 minutes at 170° to 180°C. After cooling to room temperature, 50 ml of water are added whilst cooling with ice, and the brown precipitate is filtered off, washed with water and subsequently with methanol and dried in vacuo at 70°C. 3.8 g of the compound of formula

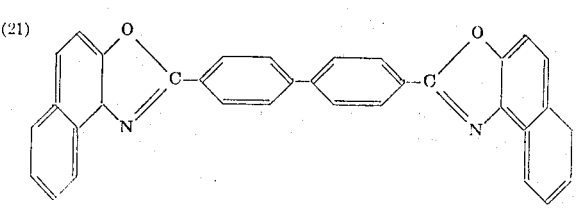
(21)

are obtained as a yellow-brown substance. After chromatography on aluminum oxide (activity I according to Brockmann) with methylene chloride as the eluting agent, and subsequent recrystallization from o-dichlorobenzene, greenish-yellow crystals of melting point 357° to 358°C are obtained.

$C_{34}H_{20}O_2N_2 \cdot 1/5$ dichlorobenzene
Calculated: C 81.4 H 4.1 N 5.4
Found: C 81.6 H 4.1 N 5.5.

EXAMPLE 4

13.95 g of diphenyl-4,4'-dicarboxylic acid dichloride and 15.9 g of 2-amino-3-naphthol in 125 ml of trichlorobenzene are heated in a stream of nitrogen whilst stirring, to 190°C over the course of 3 hours and to 210°C over the course of a further 2 hours. The compound of formula

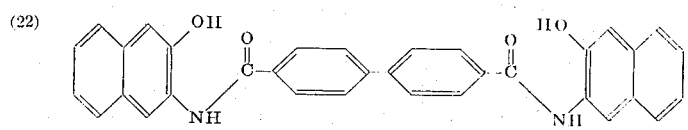
(22)

hereupon forms, with hydrogen chloride being split off. The yellow product (26.1 g) is filtered off, washed with carbon tetrachloride and dried. Melting point <360°C.

5.24 g of this amide (crude product) are heated to 330°C with 0.2 g of boric acid anhydride in 50 ml of dibutyl phthalate, in the course of which the water formed, and a little solvent, distil off and an almost clear solution is produced. The mixture is allowed to cool and the compound of formula

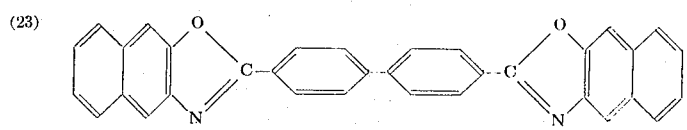
(23)

which has crystallized out is filtered off, washed with alcohol and dried in vacuo at 80°C. 3.2 g of light green crystals are obtained. Recrystallization from trichlorobenzene with the aid of Fuller's earth yields light yellow crystals which do not melt below 360°C.

$C_{34}H_{20}O_2N_2$
Calculated: C 83.59 H 4.13 N 5.73
Found: C 83.18 H 4.31 N 5.22

EXAMPLE 5

10.0 g of the compound of formula

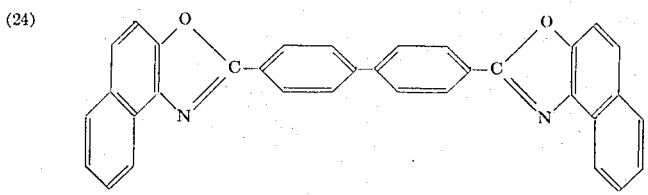
(24)

in 200 ml of 95 percent strength sulphuric acid are stirred for 30 minutes at 80° to 90°C. After cooling, the resulting greenish-brown solution is poured onto 500 g of ice and the precipitate is filtered off, washed with methanol and dried in vacuo at 80°C. 9.5 g of the compound of formula

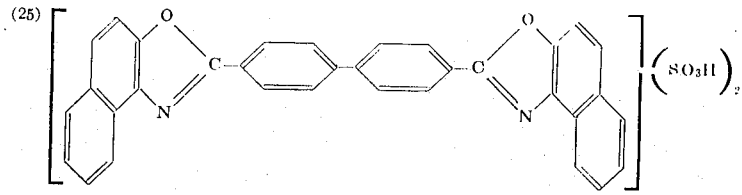
(25)

are obtained as a brownish-yellow powder which dissolves in aqueous triethanolamine to form the triethanolammonium salt.
$C_{34}H_{20}O_8N_2S_2 \cdot 4 H_2O$
Calculated: N 3.9 S 8.9
Found: N 4.0 S 8.7

EXAMPLE 6

Hundred parts of polyester granules of polyterephthalic acid ethylene glycol ester are intimately mixed with 0.05 part of the compound of Formula (19), (20) or (21) and melted at 285°C whilst stirring. After spinning the spinning composition through the usual spinnerets, greatly brightened polyester fibers are obtained. The compound of Formula (19), (20) or (21) can also be added to the starting substances before or during the polycondensation to give the polyester.

EXAMPLE 7

Ten thousand parts of a polyamide, manufactured from hexamethylenediamine adipate in a known manner, in chip form are mixed with 30 parts of titanium dioxide (rutile modification) and 10 parts of the compound of Formula (19), (20) or (21) in a tumbler vessel for 12 hours. The chips treated in this way are melted, after displacement of the atmospheric oxygen by superheated steam, in a kettle heated to 300°–310°C by means of oil or diphenyl vapor, and stirred for half an hour. The melt is thereafter extruded under a nitrogen pressure of 5 atmospheres gauge through a spinneret, and the filament which has been spun in this way and cooled is wound on a spinning bobbin. The resulting filaments show an excellent brightening effect, which is stable to thermofixing, and has good fastness to washing and light.

EXAMPLE 8

Ten thousand parts of a polyamide, manufactured from ε-caprolactam in a known manner, in chip form are mixed for 12 hours with 30 parts of titanium dioxide (rutile modification) and two parts of the compound of formula (19), (20) or (21) in a tumbler vessel. The chips treated in this way are melted, after displacement of the atmospheric oxygen, in a kettle heated to 270°C and stirred for half an hour. The melt is thereafter extruded through a spinneret under a nitrogen pressure of 5 atmospheres gauge and the cooled filament is wound on a spinning bobbin. The resulting filaments show an excellent brightening effect which is resistant to thermofixing and has good fastness to washing and light.

I claim:

1. An azole compound which corresponds to the formula

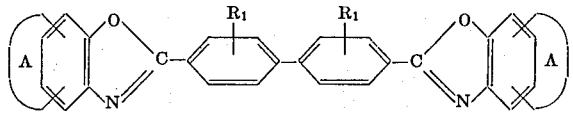

wherein A denotes a benzene ring fused onto the benzoxazole ring system and $R_1$ represents a member selected from the group consisting of hydrogen and an alkyl group container one to four carbon atoms.

2. An azole compound according to claim 1 which corresponds to the formula

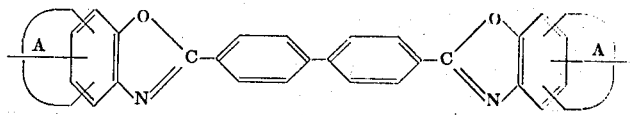

wherein A denotes a benzene ring fused onto the benzoxazole ring system.

3. An azole compound according to claim 1 which corresponds to the formula

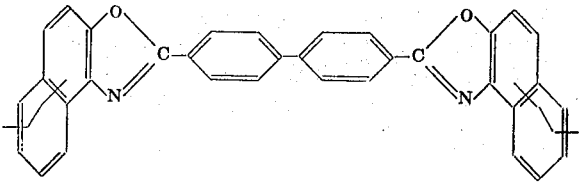

4. The product containing one or two sulfonic acid groups obtained by sulfonating with concentrated sulfuric acid or oleum a compound of the formula

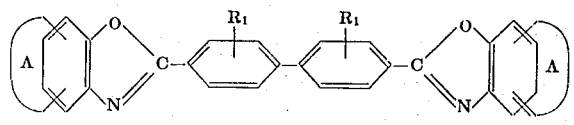

wherein A denotes a benzene ring fused onto the benzoxazole ring system and $R_1$ represents a member selected from the group consisting of hydrogen and an alkyl group containing one to four carbon atoms.

* * * * *

FORM PO-1050 (5/69)

UNITED STATES PATENT OFFICE
CERTIFICATE OF CORRECTION

Patent No. 3,682,946                    Dated August 8, 1972

Inventor(s) PETER LIECHTI

It is certified that error appears in the above-identified patent and that said Letters Patent are hereby corrected as shown below:

Cover page, after "[73] Assignee:" delete "Ciba-Geigy" and insert --- CIBA-GEIGY AG, Basle Switzerland ---.

Signed and sealed this 23rd day of April 1974.

(SEAL)
Attest:

EDWARD M. FLETCHER, JR.
Attesting Officer

C. MARSHALL DANN
Commissioner of Patents